(12) United States Patent
Edmonds et al.

(10) Patent No.: US 12,256,709 B1
(45) Date of Patent: Mar. 25, 2025

(54) DETACHABLE WATER CONTAINER

(71) Applicant: Edmonds Outdoors, LLC, Nashville, TN (US)

(72) Inventors: Addison Edmonds, Brentwood, TN (US); Gene Andrew Sparks, Nashville, TN (US)

(73) Assignee: Edmonds Outdoors, LLC, Nashville, TN (US)

( * ) Notice: Subject to any disclaimer, the term of this patent is extended or adjusted under 35 U.S.C. 154(b) by 150 days.

(21) Appl. No.: 17/989,835

(22) Filed: Nov. 18, 2022

Related U.S. Application Data (60) Provisional application No. 63/280,814, filed on Nov. 18, 2021.

(51) Int. Cl.
*A01K 1/035* (2006.01)

(52) U.S. Cl.
CPC .................................. *A01K 1/0356* (2013.01)

(58) Field of Classification Search
CPC .. B65D 2313/04; B65D 83/262; B65D 88/44; B65D 9/12; B65D 9/18; B65D 11/1866; B65D 11/1893; A01K 1/0356
See application file for complete search history.

(56) References Cited

U.S. PATENT DOCUMENTS

| | | | | |
|---|---|---|---|---|
| 3,556,341 | A * | 1/1971 | Rains | A47G 23/0225 D7/510 |
| 4,184,612 | A * | 1/1980 | Freyre | H03K 3/284 239/70 |
| 6,520,367 | B1 * | 2/2003 | Piroch | A47F 1/06 220/483 |
| 9,845,038 | B2 * | 12/2017 | Mak | B60N 3/103 |
| 9,980,439 | B2 * | 5/2018 | Aller | B65D 25/22 |
| 10,105,012 | B2 * | 10/2018 | Yurkovetskaya | B65D 43/0231 |
| 11,690,429 | B2 * | 7/2023 | Fromme | B65D 1/06 220/483 |
| 2009/0122259 | A1 * | 5/2009 | Szumski | A45C 11/04 351/158 |

* cited by examiner

Primary Examiner — Kareen K Thomas
(74) Attorney, Agent, or Firm — Holland & Knight LLP; Matthew C. Cox (57) ABSTRACT

A detachable fluid container apparatus for attachment to a structure is provided. The apparatus includes a container, a first base member, a second base member, a first magnet, and a second magnet. The first base member is disposed on the container and configured to be secured to the structure. The second base member is configured to mate with the first base member in a detachable engagement. The first magnet is disposed on the first base member, and the second magnet is disposed on the second base member, thus configured to provide a magnetic engagement with the first magnet when the second base member mates with the first base member.

12 Claims, 12 Drawing Sheets

DETACHABLE WATER CONTAINER

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application is a non-provisional of U.S. Patent Application No. 63/280,814 filed Nov. 18, 2021 entitled DETACHABLE WATER CONTAINER, which is hereby incorporated by reference in its entirety.

STATEMENT REGARDING FEDERALLY SPONSORED RESEARCH OR DEVELOPMENT

Not Applicable.

REFERENCE TO SEQUENCE LISTING OR COMPUTER PROGRAM LISTING APPENDIX

Not Applicable.

BACKGROUND

The present disclosure relates generally to devices for providing fluid to animals, and more particularly to detachable containers for use on a variety of different structures, including but not limited to portable animal kennels.

Conventional devices for providing fluid for animals provide bowls, buckets, troughs and other simple container devices for holding fluid. Some conventional animal kennels typically fail to include fluid containers for providing fluid to an animal housed inside the kennel. When using a conventional fluid bowl, the bowl may be easily turned over and fluid may be spilled. Others have tried to overcome this problem by providing mounted fluid containers that may be secured to a door or wall of a structure, such as an animal kennel. However, conventional mounted configurations are difficult to use, may move around during transport, and are difficult to install and remove.

What is needed then are improvements in devices, systems and methods for providing fluid to animals.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the disclosure is detachable fluid container apparatus for attachment to a structure. The apparatus includes a container, a first base member, a second base member, a first magnet, and a second magnet. The first base member is disposed on the container and configured to be secured to the structure. The second base member is configured to mate with the first base member in a detachable engagement. The first magnet is disposed on the first base member, and the second magnet is disposed on the second base member, thus configured to provide a magnetic engagement with the first magnet when the second base member mates with the first base member.

Another aspect of the disclosure is a detachable container apparatus. The apparatus includes a container, a first base member, a second base member, and a funnel. The first base member is disposed on the container, and the second base member is configured to mate with the first base member in a detachable mating attachment. The funnel has a reservoir and a spout. The funnel is configured to be secured to a structure having a first side and a second side opposite the first side, such that the reservoir is mounted to the second side of the structure and the spout protrudes from the first side of the structure at a location that is above the container. The funnel is configured to be positioned above the fluid container and dispense fluid directly into the container.

A further aspect of the disclosure is a system for providing fluid to an animal, including a container having a base that is detachably securable to a structure, and a funnel including a reservoir and a spout and configured to be positioned above the container.

Numerous other objects, advantages and features of the present disclosure will be readily apparent to those of skill in the art upon a review of the following drawings and description of a preferred embodiment.

DETAILED DESCRIPTION

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

Figure 1:
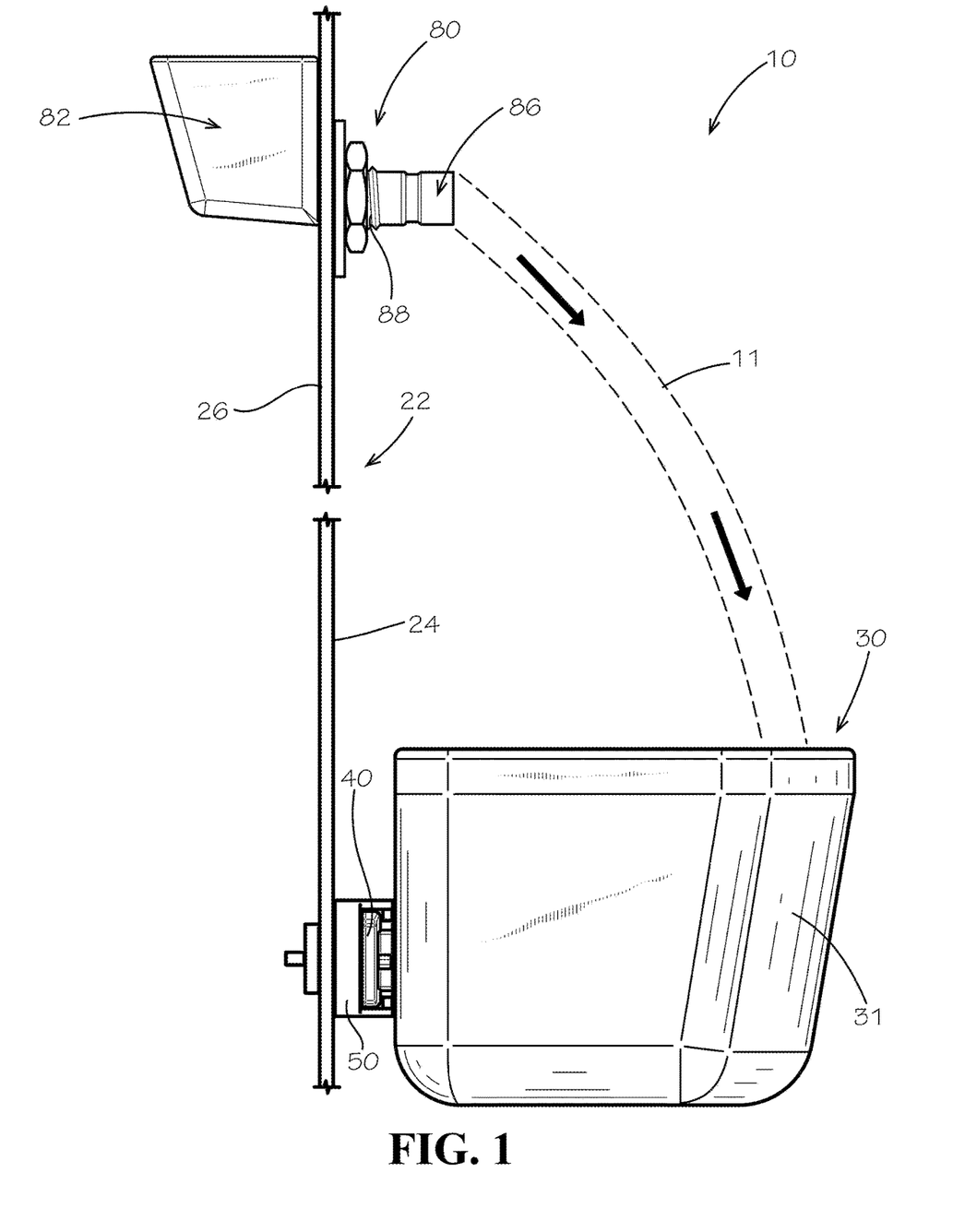
FIG. 1 is a side view of an embodiment of an apparatus with a funnel and a container for providing fluid to an animal mounted on a structure.

Referring to FIG. 1, the present disclosure in some embodiments includes a detachable fluid container apparatus (apparatus) 10. In some embodiments, the apparatus 10 may be used to provide a fluid 11 (e.g., water, milk, medicine, or some other liquid) to an animal. In some embodiments, the device 10 includes a container 30 and a funnel 80. As described in greater detail below with reference to FIGS. 2-4, the container 30 may include a first base member 40. The first base member 40 may be operable to form a detachable engagement (e.g., a mechanical engagement where one component can be secured and/or removed with respect to another component) with a second base member 50 (described in greater detail below with reference to FIGS. 5-8). Together, the first base member 40 and the second base member 50 may be considered a two-piece detachable base that is configured to be detachably secured to a structure 22 (e.g., a mounting structure). As an example, the structure 22 may be a door on an animal kennel, as shown with reference to FIGS. 12-17. As another example, the structure 22 may be a wall on an animal kennel. As other examples still, the structure 22 may be a different feature on the kennel, a desk, a structure within a vehicle, or any other suitable structure for implementing the device 10 as provided for herein. Although generally depicted herein as a single structure, the structure 22 may be two or more structures. The structure 22 may have an interior side 24 and an exterior side 26.

Figure 2:
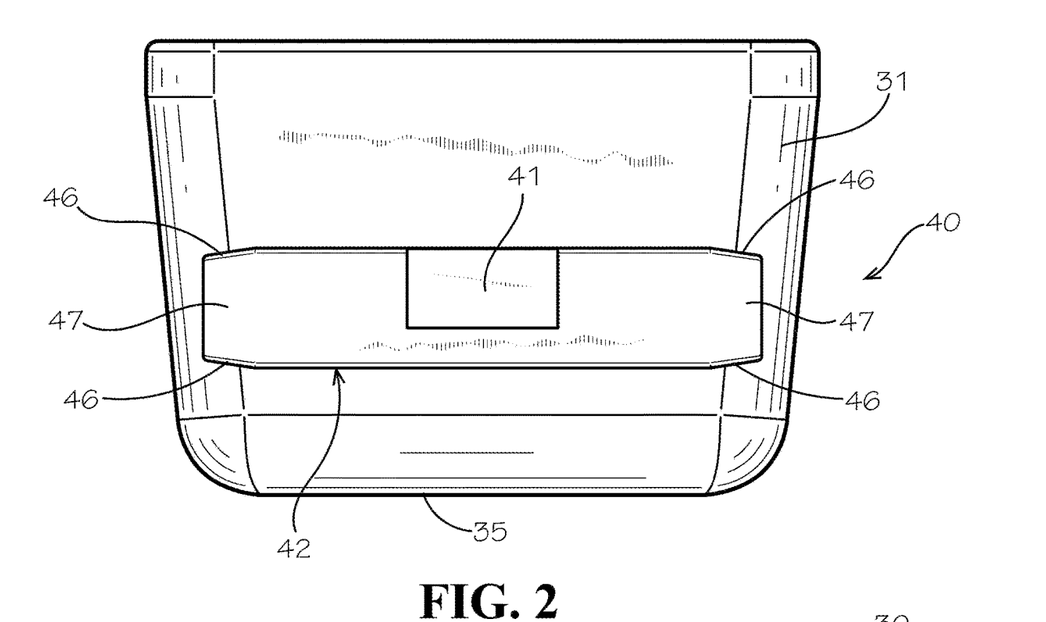
FIG. 2 is a rear view of an embodiment of the container of FIG. 1.
Figure 3:
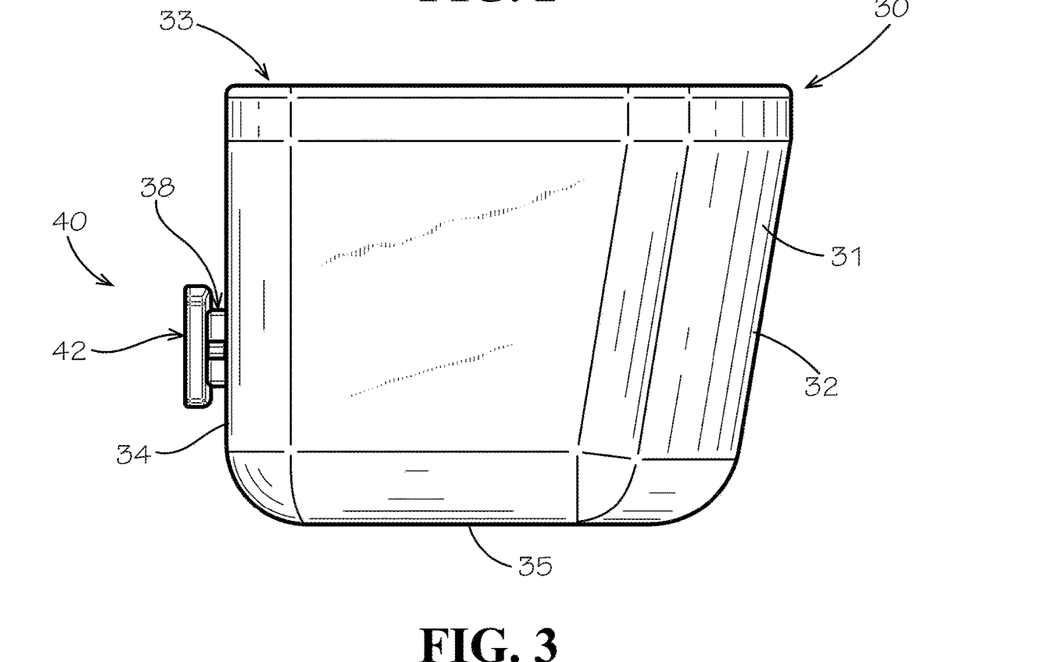
FIG. 3 is a side view of an embodiment of the container of FIG. 1.
Figure 4:
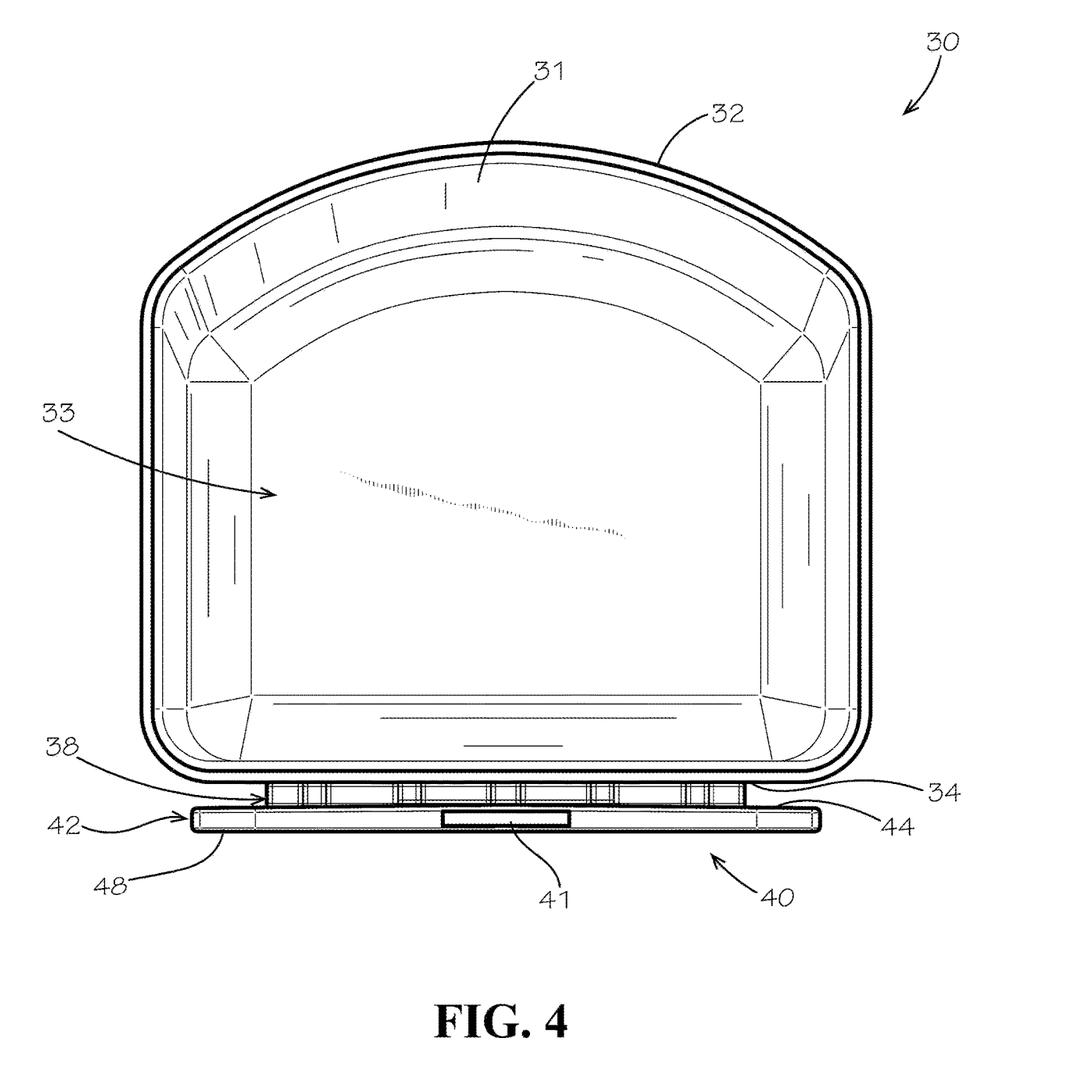
FIG. 4 is a top view of an embodiment of the container of FIG. 1.
Figure 5:
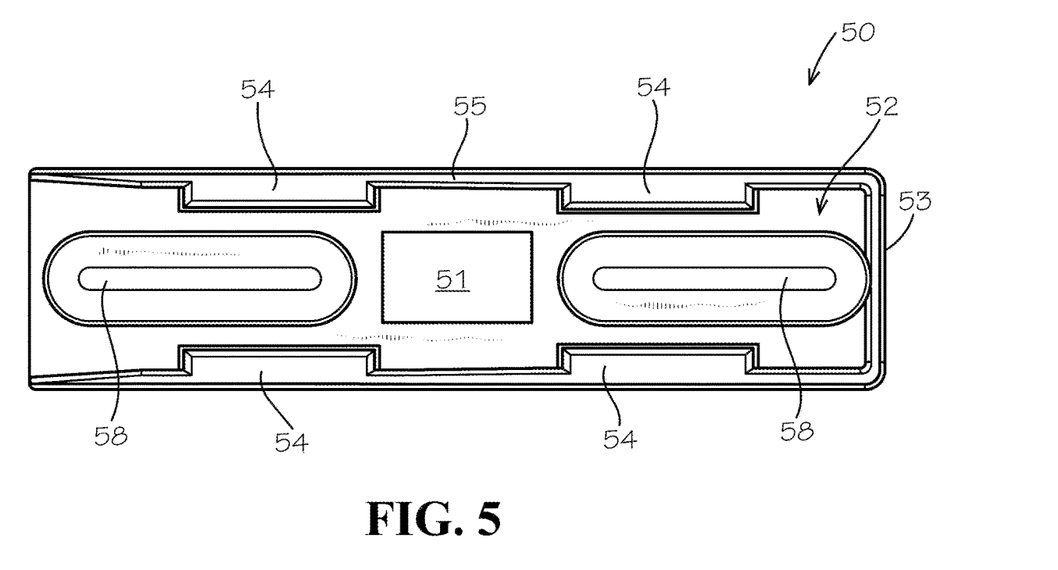
FIG. 5 is a front view of an embodiment of a base member for securing the container of FIG. 1 to the structure of FIG. 1.
Figure 6:
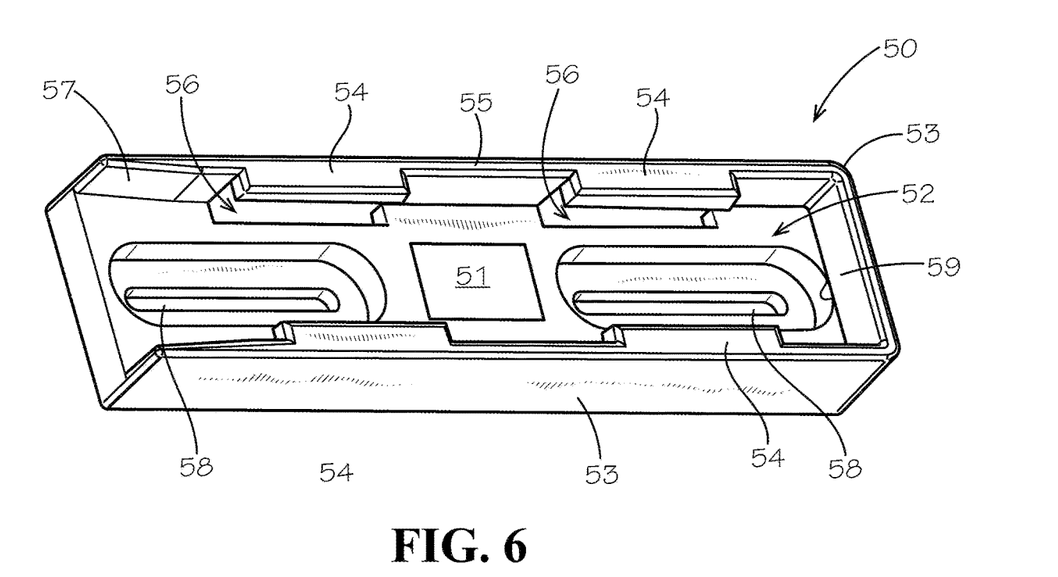
FIG. 6 is a front perspective view of an embodiment of a base member for securing the container of FIG. 1 to the structure of FIG. 1.
Figure 7:
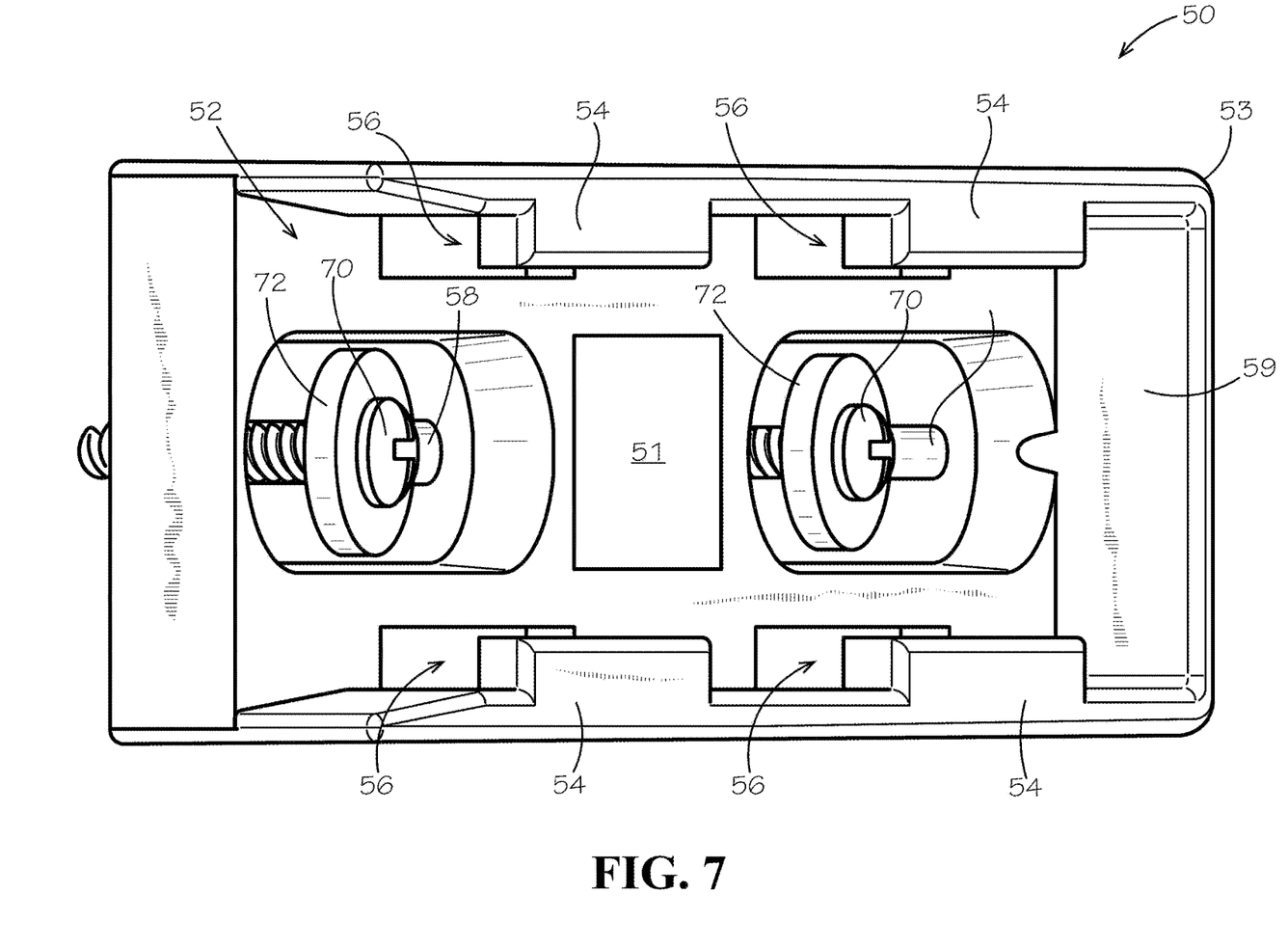
FIG. 7 is a side perspective view of an embodiment of a base member for securing the container of FIG. 1 to the structure of FIG. 1.

Referring now to FIGS. 2-4, the container 30 is shown in greater detail, according to some embodiments. As mentioned above, the container 30 includes the first base member 40. For example, the container 30 may include a container body 31 that is integrally molded with the first base member 40 as a one-piece, unitary structure. As another example, the container body 31 and the first base member 40 may be separate components that are coupled together (e.g., via an adhesive or mechanical attachment). As described in greater detail below, the container 30 may be secured to the structure 22 by the first base member 40 and be formed to receive and hold fluid that is dispensed from the funnel 80. As shown with reference to FIG. 1, the container 30 may be secured to the structure 22 such that the container 30 is positioned below the funnel 80. In some embodiments, the container 30 is mounted to the interior side 24 of the structure 22. In other embodiments, the container 30 is mounted to the exterior side 26 of the structure 22.

In order to receive the fluid dispensed from the funnel 80, the container 30 may include a container opening 33 above a container base 35, with a number of container walls extending from the container base 35 to the container opening 33, thereby forming the container body 31. In order to provide protection against over-travel of the dispensed fluid, one of the aforementioned container walls may be a convex front wall 32. The convex front wall 32, therefore, may prevent the dispensed fluid from inadvertently spilling outside of the container body 31 during filling. Another one of the aforementioned container walls may be a flat back wall 34 in order to form a close proximity between the container body 31 and the structure 22 when the container 30 is secured thereto by the first base member 40.

In some embodiments, the first base member 40 includes a boss 38 and an insert 42. The boss 38 may extend from or protrude from the flat back wall 34 of the container body 31 to an inner face 44 of the insert 42, such that the insert 42 is offset from the flat back wall 34. In some embodiments, the insert 42 forms a male geometry that is configured for a detachable engagement with the second base member 50. For example, the insert 42 may include one or more chamfered corners 46 on one or more tips 47 in order to facilitate a lateral sliding of the insert 42 relative to the female geometry of the second base member 50, as depicted in greater detail below with reference to FIG. 9.

In some embodiments, the first base member 40 includes a first magnet 41 disposed on a surface of the first base member 40 facing away from the container body 31. For example, the first magnet may be disposed on an outer face 48 of the insert 42. In some embodiments, the first magnet 41 may be secured to the first base member 40 using an adhesive or fasteners. In other embodiments, the first magnet 41 may be molded into the first base member 40 or some other suitable method of attachment. The first magnet 41 includes any suitable magnet known in the art.

When the first base member 40 is detachably engaged with the second base member 50, the first magnet 41 may face the second base member 50. In some embodiments, the first magnet 41 is positioned to engage a corresponding second magnet 51 on the second base member 50 to provide a magnetic engagement (in addition to, or in support of, the detachable engagement) between first and second base members 40, 50.

Referring now to FIGS. 5-8, the second base member 50 is shown, according to some embodiments. In some embodiments, the second base member 50 includes a bracket 52, an edge projection 53 extending from the bracket 52, and one or more mounting slots 58 formed on the bracket 52. The second base member 50 may be secured to the structure 22 to provide a location to mount the container 30. For example, as mentioned above, the first base member 40 of the container 30 may be configured to form a detachable engagement with the second base member 50, which may be secured to the structure 22.

Figure 8:
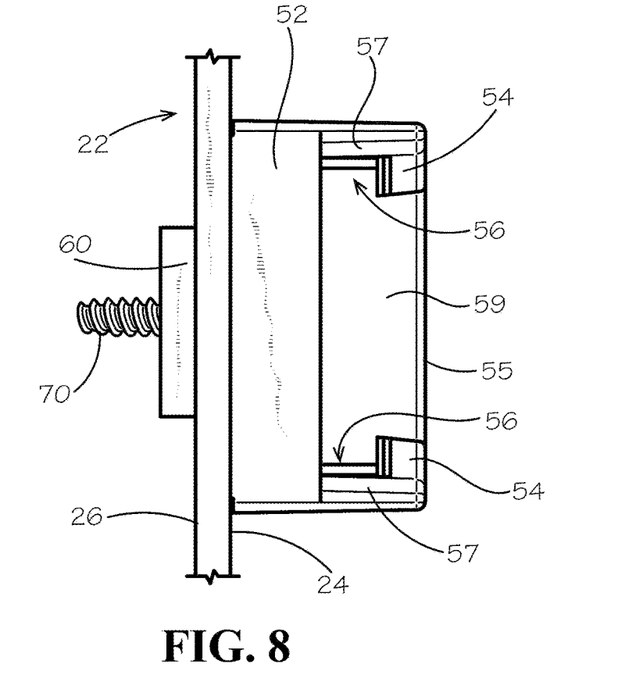
FIG. 8 is a side view of an embodiment of a base member for securing the container of FIG. 1 to the structure of FIG. 1.

In some embodiments, and as shown with reference to FIGS. 1 and 8, the second base member 50 is secured to the interior side 24 of the structure 22. Depending on the implementation, the second base member 50 may be mounted at any location on the structure 22 using the one or more mounting slots 58. For example, each of the one or more mounting slots 58 may be configured to receive a portion of each of one or more fasteners 70. The one or more mounting slots 58 may be formed as elongate openings with lengths that that extend laterally across the bracket 52. Each of the one or more fasteners 70 may pass through the one or more mounting slots 58, as well as the structure 22, in order to secure the second base member 50 to the structure 22.

In some embodiments, and as shown with particular reference to FIG. 8, a backing plate 60 is positioned on the side of the structure 22 opposite second base member 50 (e.g., the exterior side 26). Each of the one or more fasteners 70 may engage the one or more mounting slots 58, extend through the structure 22, and engage a corresponding portion (e.g., an opening or aperture) of the backing plate 60, such that the structure 22 is clamped between the second base member 50 and the backing plate 60. As an example, the fasteners 70 may be threaded bolts that engage threaded apertures or openings of the backing plate 60. As another example, the fasteners 70 may be threaded bolts that pass through smooth openings or apertures on the backing plate 60, and are secured to the backing plate 60 via threaded nuts. Thus, when the fasteners 70 are tightened relative to the backing plate 60, the fasteners secure the second base member 50 in place via engagement with the one or more mounting slots 58.

In some embodiments, when the fasteners 70 are tightened relative to the backing plate 60, the fasteners 70 rest within the one or more mounting slots 58 on one or more washers 72. As mentioned above, the one or more mounting slots 58 may be formed as elongate openings with lengths that extend laterally. Because each of the one or more fasteners 70 are engaged with each of the one or more mounting slots 58, rather than a hole or similarly limited opening, the second base member 50 may be positioned at different lateral locations relative to the lengths of the one or more mounting slots 58. This may allow for lateral alignment of the backing plate 60 (and the one or more fasteners 70 engaged therewith) at a desired location on the structure 22 relative to the second base member 50, so long as each of the one or more fasteners 70 are positioned to extend through some portion of each of the one or more mounting slots 58.

In some embodiments, one or more flanges 54 extend inward from an outer lip 55 of the edge projection 53 toward the center of the bracket 52, thus forming one or more grooves 56 (e.g., elongate gaps between the one or more flanges 54 and the bracket 52). The one or more flanges 54 may be configured to receive a portion of the first base member 40 (such as the insert 42) within the one or more grooves 56. For example, the one or more grooves 56 may face away from the structure 22 on which the second base member 50 is mounted. Return here As mentioned above, the insert 42 may form a male geometry that is configured for detachable engagement with the second base member 50. As a corollary, the one or more grooves 56 may form an undercut female geometry, such that the second base member 50 is configured for corresponding detachable engagement with the first base member 40. For example, and as depicted in greater detail below with reference to FIG. 9, the one or more grooves 56 may allow the insert 42 to perform a male/female sliding engagement therein, such that the insert 42 slides relative to the one or more grooves 56 (e.g., in a direction in order to secure the first base member 40 to the second base member 50. Thus, the insert 42 of the first base member 40 (and thus the container body 31 formed therewith or attached thereto) is configured to detachably engage the second base member 50 in a mating engagement.

In some embodiments, the second base member 50 includes a second magnet 51 disposed on a surface of the second base member 50 and facing toward the one or more flanges 54. For example, the second magnet 51 may be disposed on the bracket 52 in between the one or more mounting slots 58. In some embodiments, the second magnet 51 may be secured to the second base member 50 using an adhesive or fasteners. In other embodiments, the second magnet 51 may be molded into the second base member 50 or some other suitable method of attachment. The second magnet 51 includes any suitable magnet known in the art.

As mentioned above, the first base member 40 includes the first magnet 41. The second magnet 51 is positioned to provide a magnetic engagement with the first magnet 41 on the first base member 40. Accordingly, in addition to, or in support of, the detachable engagement between the first and second base members 40, 50 as described herein, the first and second magnets 41, 51 are configured to provide a magnetic engagement between the first and second base members 40, 50. For example, when the insert 42 of the first base member 50 is slid into the one or more grooves 56 on the second base member 50, or vice versa, the first and second magnets 41, 51 attract and tend to move toward alignment, causing the first and second base members 40, 50 to become fully seated with respect to each other. The first and second magnets 41, 51 also prevent the first and second base members 40, 50 from inadvertently becoming disengaged and sliding loose during use (e.g., during travel). In some embodiments, only one magnet of the first and second magnets 41, 51 is provided, and the opposing structure (e.g., the structure 22) is made of, or includes, a magnetic material, such as a metal.

In some embodiments, the edge projection 53 includes one or more lateral portions and one or more vertical portions. As shown, the edge projection 53 may include two vertical retainers 57 (e.g., lateral portions of the edge projection 53) and a single lateral retainer 59 (e.g., a vertical portion of the edge projection 53), such that the edge projection 53 forms an opening on a side that is opposite the lateral retainer 59. The two vertical retainers 57 may extend parallel to the one or more grooves 56, while the lateral retainer 59 may extend perpendicularly to the one or more grooves 56. The lateral retainer 59 of the edge projection 53 may act as a mechanical stop for the detachable engagement and/or the magnetic engagement discussed herein. For example, when the insert 42 of the first base member 50 is slid into the one or more grooves 56 on the second base member 50, or vice versa, one of the one or more tips 47 of the insert 42 may engage the lateral retainer 59. Accordingly, the insert 42 may be guided into the opening formed by the edge projection 53 in order to initiate the detachable and/or magnetic engagement described herein, laterally slid within the one or more grooves 56 and relative to the bracket 52, and stopped by an engagement between one of the tips 47 and the lateral retainer 59 when the first and second base members 40, 50 are fully seated relative to one another.

Figure 9:
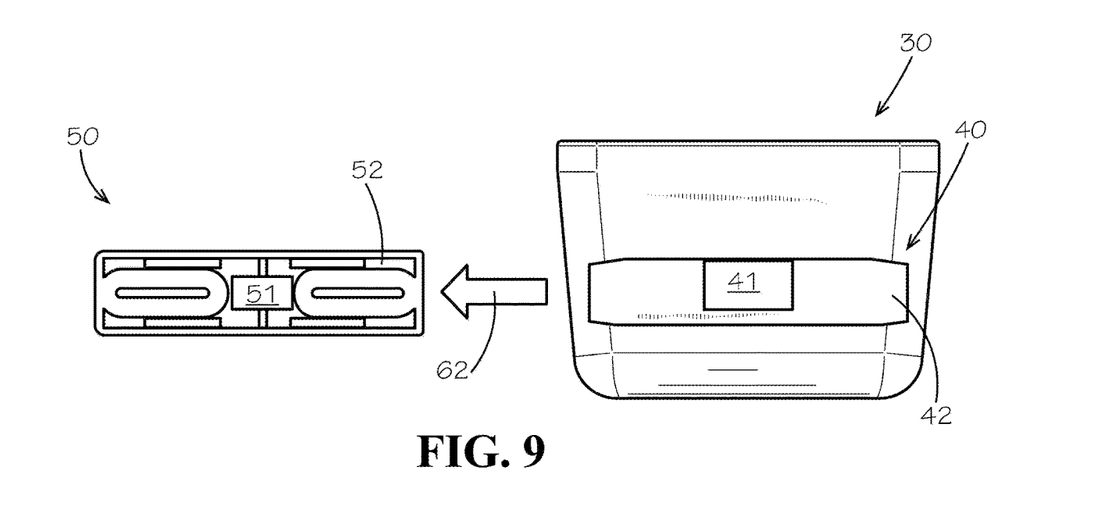
FIG. 9 is a schematic view of an embodiment a base member on the container of FIG. 1 engaging an embodiment of the base member of FIG. 5.

Referring now to FIG. 9, the container first base member 40 and the second base member 50 are shown relative to one another in order to effectuate the detachable engagement discussed herein. As mentioned above, the insert 42 may form a male geometry that is configured for a detachable engagement with female geometry formed by the second base member 50. For example, the insert 42 may perform a male/female sliding engagement where the insert 42 laterally slides relative (e.g., in a direction 62) to the female geometry defined by the second base member 50 in order to engage the first base member 40 (and, thus, the container 30) with the second base member 50, thereby forming the aforementioned detachable engagement.

In some embodiments, and as generally described herein, the detachable engagement is a sliding engagement. However, in other embodiments, the detachable engagement is a snap-fit engagement. In other embodiments still, the detachable engagement is a press-fit engagement. In the sense of a snap-fit engagement or a press-fit engagement, the bracket 52 and the insert 42 may include various additional features (e.g., recesses, projections, etc.) in order to facilitate such engagements. Moreover, although generally depicted herein as a detachable engagement in which the first and second base members 40, 50 move horizontally relative to one another in order to secure the engagement, the first and second base members 40, 50 may be configured such that they move vertically relative to one another in order to secure the detachable engagement. Accordingly, it should be appreciated that the detachable engagement may be configured according to any suitable engagement to secure the first and second base members 40, 50 together.

Figure 10:
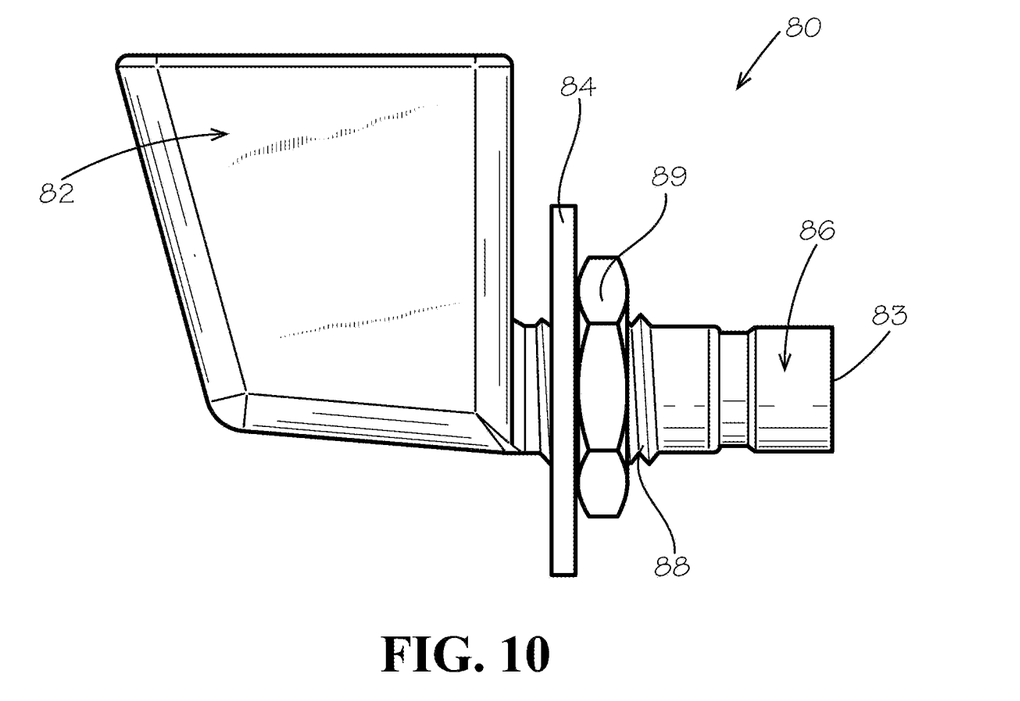
FIG. 10 is a side view of an embodiment of the funnel of FIG. 1.
Figure 11:
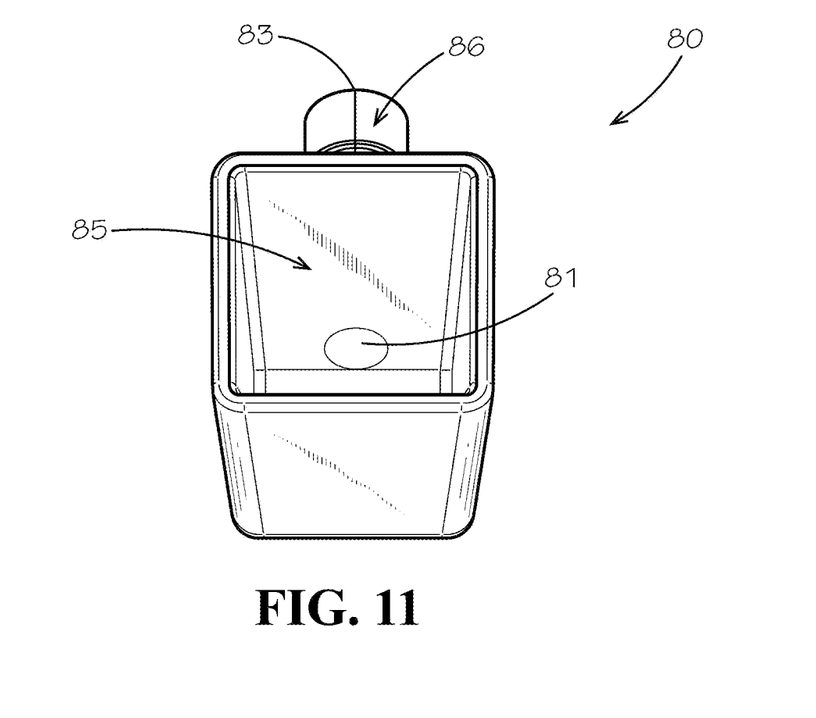
FIG. 11 is a top perspective view of an embodiment of the funnel of FIG. 1.
Figure 12:
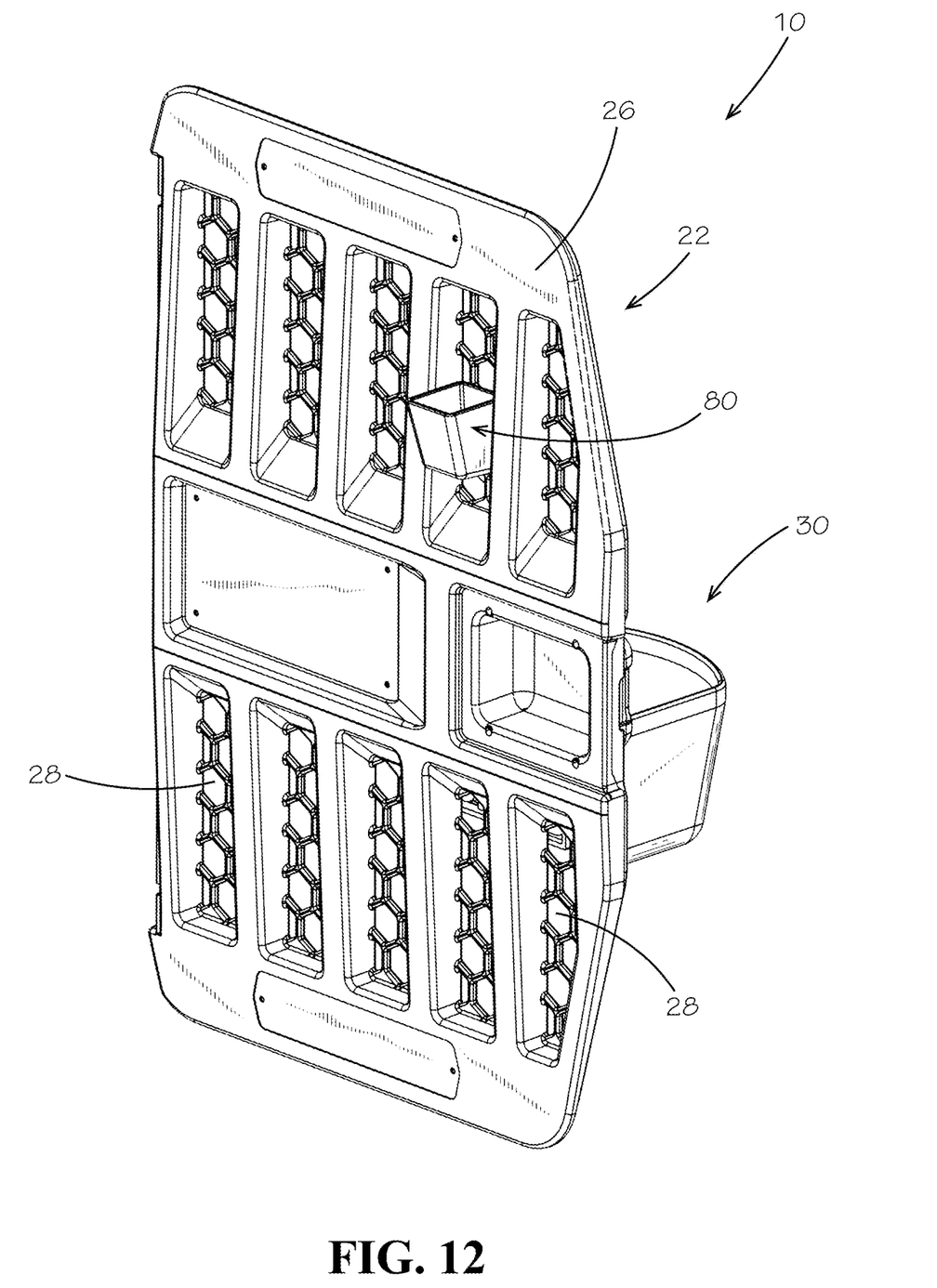
FIG. 12 is a perspective view of an embodiment of an apparatus with a funnel and a container for providing fluid to an animal mounted on a door of an animal kennel.
Figure 13:
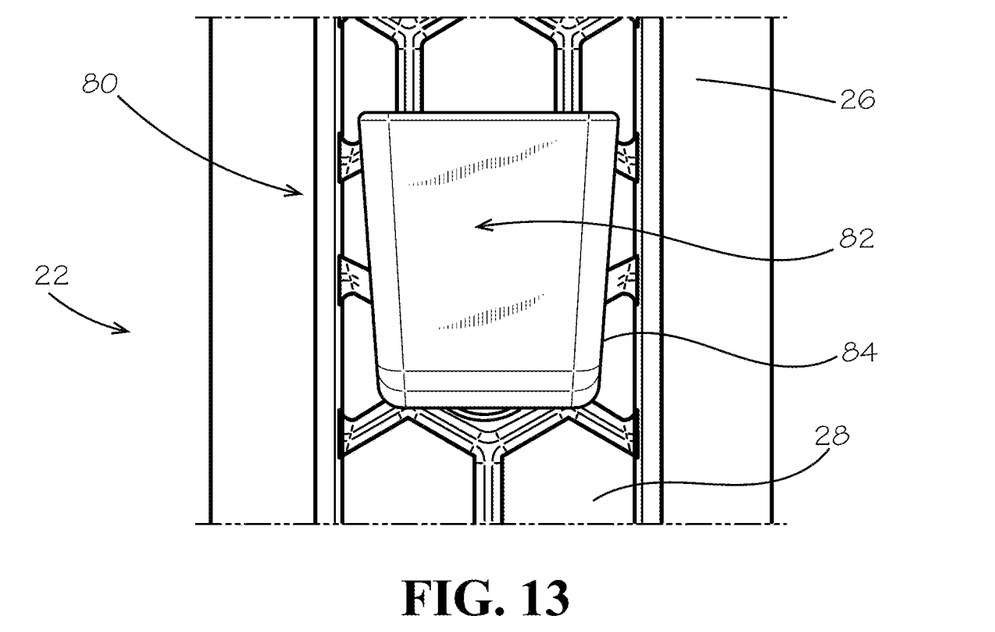
FIG. 13 is a front elevated view of an embodiment of the funnel of FIG. 12.
Figure 14:
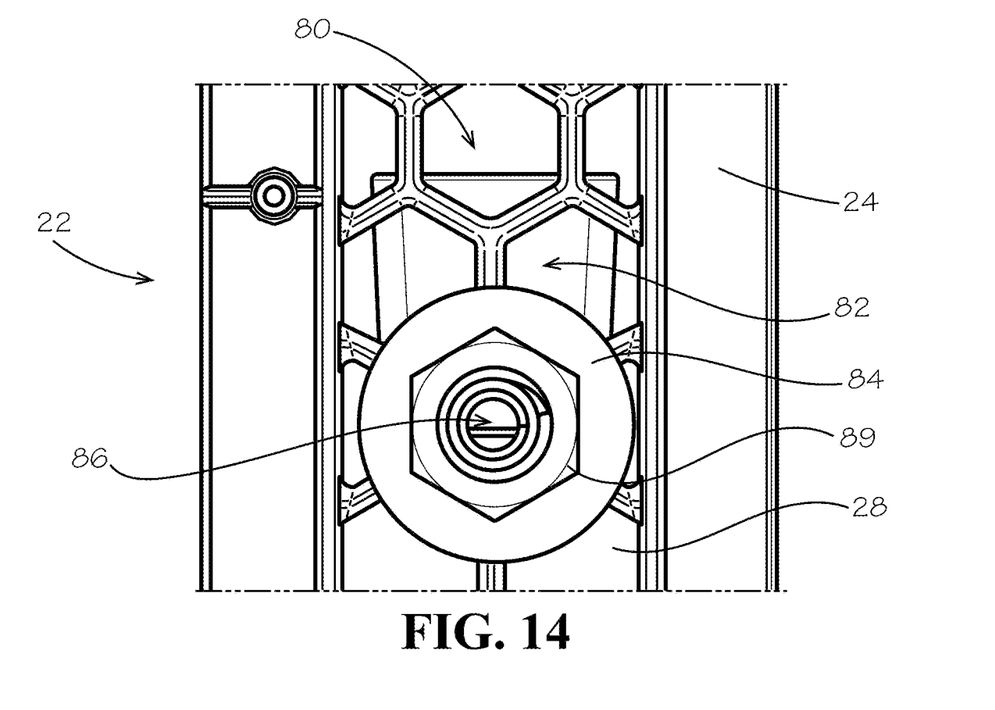
FIG. 14 is a rear elevated view of an embodiment of the funnel of FIG. 12.
Figure 15:
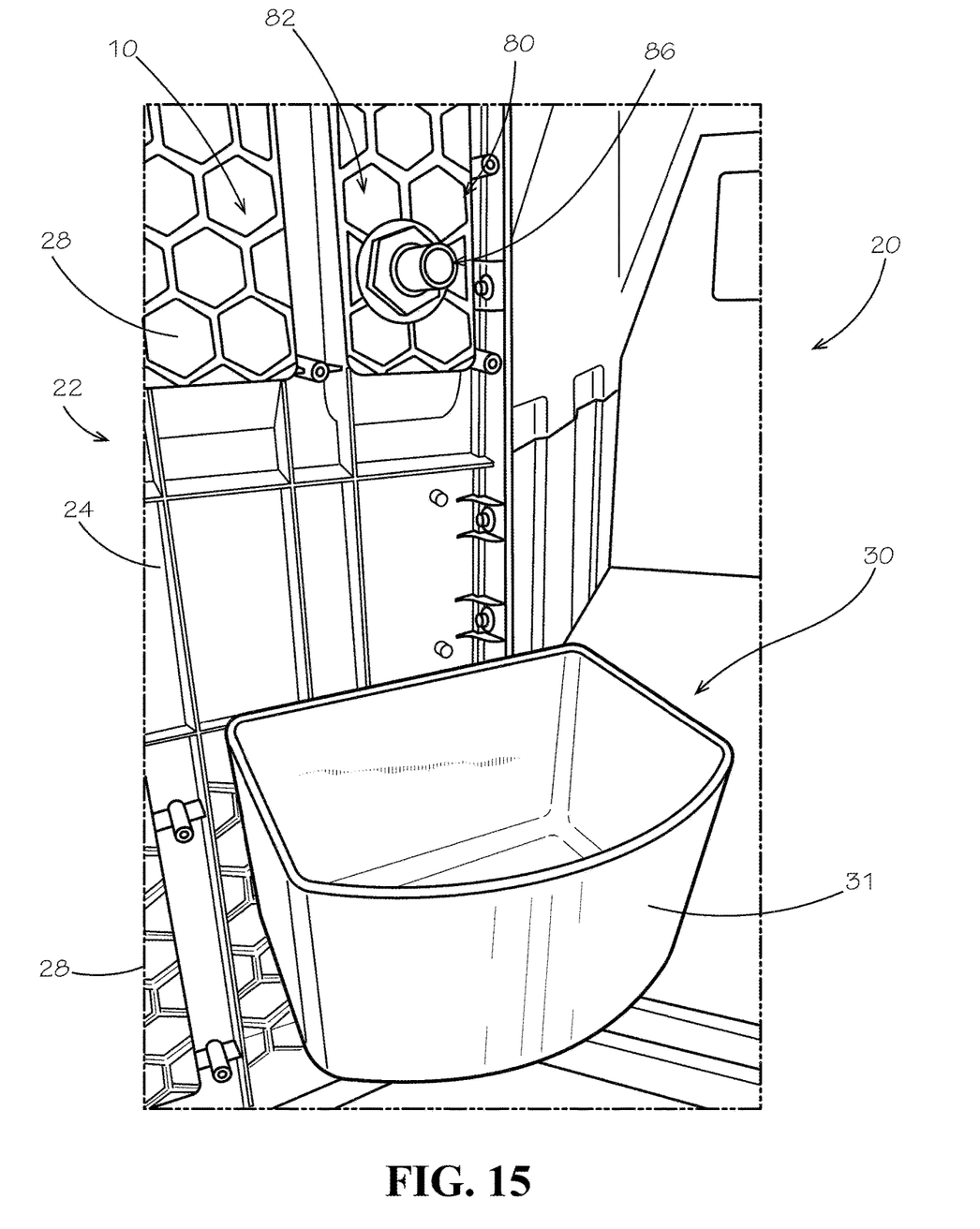
FIG. 15 is a perspective view of an embodiment of an apparatus with a funnel and a container for providing fluid to an animal mounted on a door of an animal kennel.
Figure 16:
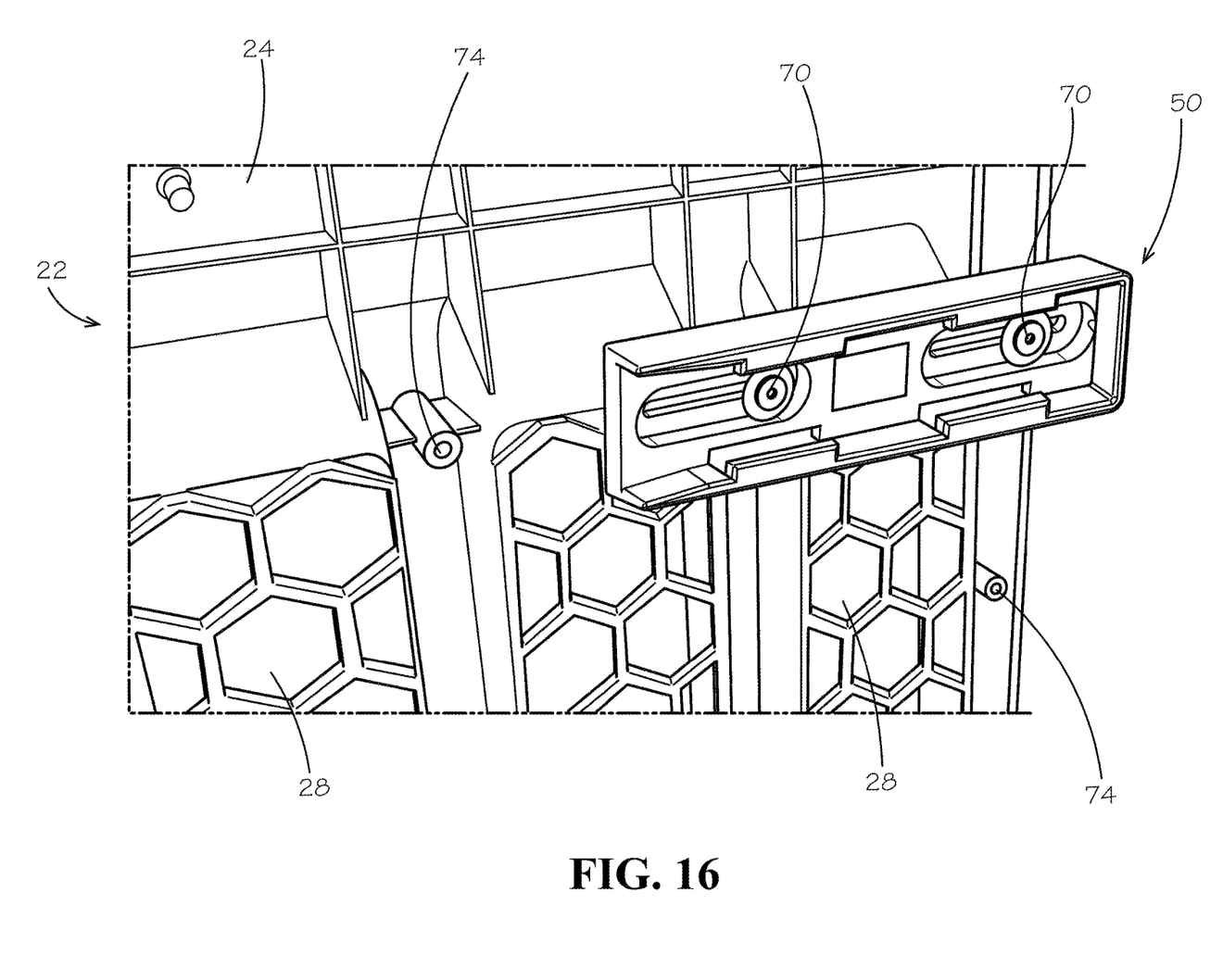
FIG. 16 is a perspective view of an embodiment of a base member for securing the container of FIG. 15 to the door of the animal kennel of FIG. 15.
Figure 17:
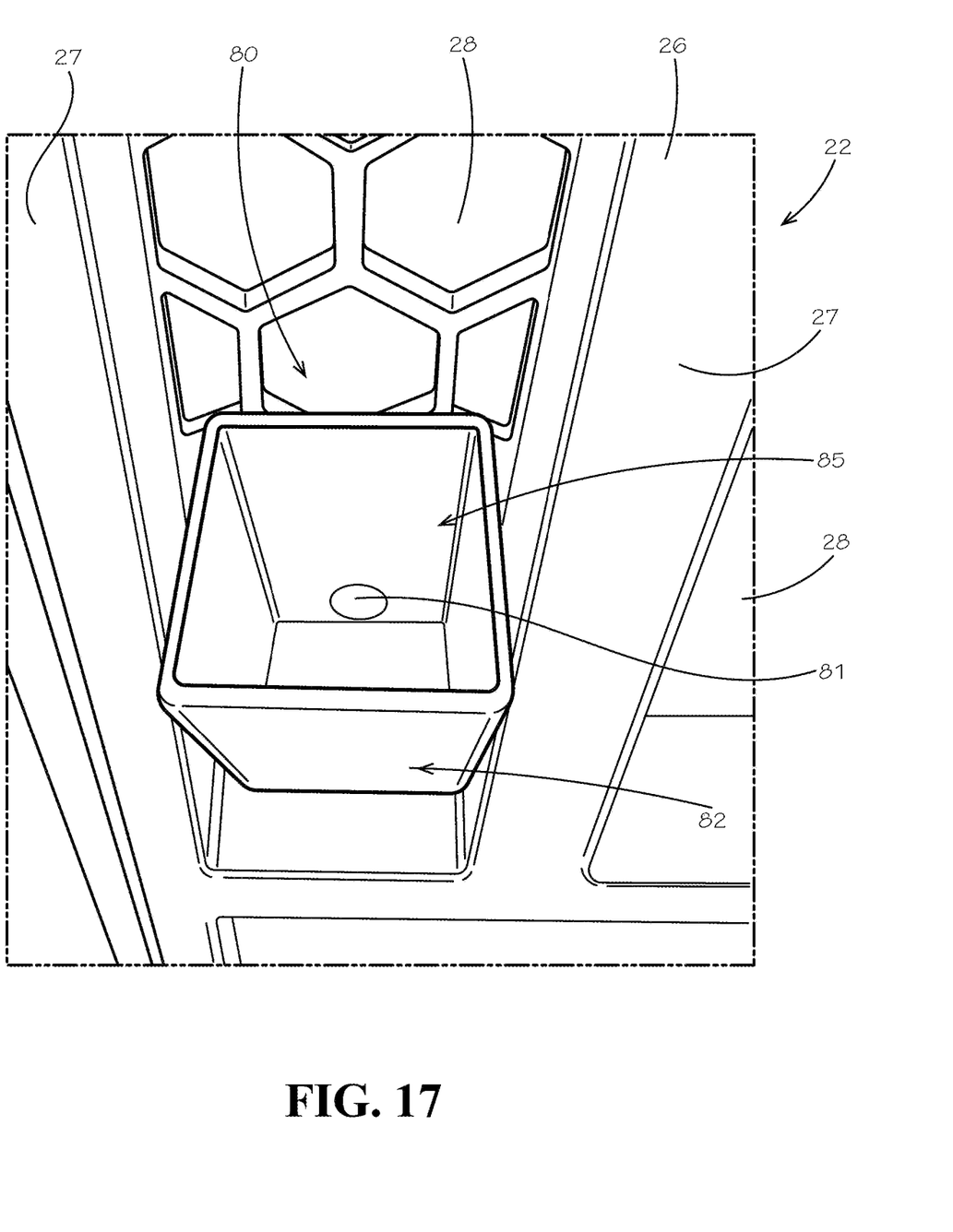
FIG. 17 is a perspective view of an embodiment of the funnel of FIG. 15 secured to the door of the animal kennel of FIG. 15.

Referring now to FIGS. 10-11, the funnel 80 is shown in greater detail, according to some embodiments. As shown with reference to FIG. 1, the funnel 80 may be secured to the aforementioned mounting structure such that the funnel 80 is positioned above the container 30 in order to dispense (e.g., eject, pour, etc.) fluid directly into the container 30 (e.g., into the opening 33 of the container body 31). For example, the funnel 80 may be secured to the structure 22 and be positioned on the structure 22 above the container 30.

In some embodiments, the funnel 80 includes a reservoir 82 that is shaped to receive fluid via a funnel opening 85. For example, fluid may be deposited (e.g., poured, dumped, placed, etc.) in the funnel opening 85 by a user. The funnel 80 may further include a spout 86 in fluid communication with the reservoir 82, and the spout 86 may form a channel within the spout 86. The spout 86 may be positioned relative to the reservoir 82 such that the fluid deposited into the reservoir 82 flows into an inlet 81 of the channel and out of an outlet 83 of the channel, thus being dispensed from the spout 86. For example, the spout 86 may be disposed on the reservoir 82 at or near the bottom of the reservoir 82. As suggested above, the fluid dispensed from the spout 86 may then be received by the container 30.

In some embodiments, and as shown with reference to FIG. 1, the funnel 80 is secured to the structure 22 such that the reservoir 82 is mounted to the exterior side 26 of the structure 22. When secured to the structure 22 as such, the funnel 80 may be oriented such that the spout 86 extends through the structure 22. Accordingly, the outlet 83 may be positioned at a location that is faced by the interior side 24 of the structure 22. In other words, the spout 86 may protrude from the interior side 24. Thus, when fluid is deposited into the reservoir 82, the fluid may flow from a first side of the structure 22 faced by the exterior side 26, through the structure 22 via the channel, and to a second side of the structure 22 faced by the interior side 24, where the fluid is dispensed from the outlet 83.

As mentioned above, the funnel 80 itself may be positioned on the structure 22 such that the funnel 80 is located above the container 30 in order to dispense fluid directly into the container 30, thereby filling the container body 31. In particular, the funnel 80 may be secured to the structure 22 such that the reservoir 82 is mounted on the structure 22, and that the spout 86 protrudes from the door at a location that is aligned above the container 30. As shown, the reservoir 82 may be mounted on the exterior side 26 of the structure 22 and the spout 86 may protrude from the interior side 24. Accordingly, fluid may be deposited into the reservoir 82 mounted on the exterior side 26 of the structure 22, flow through the channel formed by the spout 86 that protrudes from the interior side 24, out of the outlet 83, and into the opening 33 of the container body 31 which, as discussed with reference to FIGS. 2-4, may be mounted to the interior side 24 of the structure 22. In other embodiments, the funnel 80 is mounted to some other suitable structure that allows for the spout 86 to be aligned above the container 30. In some cases, the funnel 80 and the container 30 may even be mounted on different structures, so long as the spout 86 is still aligned above the container 30. Ultimately, the fluid poured into the reservoir 82 may travel through the structure on which it is mounted (via the channel) and be dispensed from the spout 86 in order to fall into the container 30.

In order to facilitate this feature, the funnel 80 may be dimensioned such that fluid from the spout 86 does not inadvertently spill outside of the container 30 during filling. For example, when the reservoir 82 is filled with fluid, a pressure is exerted on the fluid being dispensed from the spout 86, thus causing the fluid being dispensed from the spout 86 to travel a certain distance away from the outlet 83 as the fluid descends toward the container 30. Given the dimensions of the container 30 (particularly the resulting position and dimensions of the convex front wall 32), the reservoir 82 may be formed to define such a depth that does not allow for the fluid being dispensed from the spout 86 to travel past the confines of the container 30, thus ensuring that regardless of the amount of fluid deposited into the reservoir 82, all of the fluid will fall into the container 30 without being spilled or landing elsewhere. Moreover, the reservoir 82 may define an interior volume that is equal to or less than an interior volume of the container body 31. In this sense, the funnel 80 may not be inadvertently filled with enough fluid such that the container body 31 is overfilled, resulting in spilling.

As mentioned above, the funnel 80 may be secured to the structure 22. The funnel 80 may be secured to the structure 22 using any suitable fastening means. In some embodiments, the funnel 80 includes a threaded body 88 on the spout 86 between the reservoir 82 and the outlet 83. As shown with reference to FIG. 1, some or all of the threaded body 88 may protrude from the interior side 24 of the structure 22. The funnel 80 may include a corresponding threaded fastener 89 that engages the threaded body 88 to secure the funnel 80 to the structure 22. In some embodiments, the funnel 80 further includes a corresponding washer 84 that engages the structure 22 and the threaded fastener 89. In such configurations, the spout 86 may extend through the structure 22 in order to protrude from the interior side 24, such that some or all of the threaded body 88 also protrudes from the interior side 24, and the threaded fastener 89 may be secured onto the portion of the threaded body 88 that protrudes from the interior side 24, thus securing the funnel 80 to the structure 22 as shown with reference to FIG. 1.

In some embodiments, the funnel 80 is detachable from the structure 22 to allow a user to remove the funnel 80 from the when it is not needed. For example, the threaded fastener 89 may be removed from the portion of the threaded body 88 that protrudes from the interior side 24 of the structure 22, such that the spout 86 (and, thus, the funnel 80) may be removed from the structure 22.

Referring now to FIGS. 12-17, the apparatus 10 is shown in an alternative embodiment. As shown, and as suggested above, the structure 22 may be a door for a dog kennel. In these and other configurations of the structure 22, the structure 22 may include one or more openings 28 in order to facilitate securing the apparatus 10 as described herein. As an example, the second base member 50 (and thus the container 30) may be mounted at any location on the structure 22 using the one or more mounting slots 58 (shown with reference to FIGS. 5-7) in conjunction with the one or more openings 28 in order to provide the container 30 on the structure 22 at a location that is convenient for the animal. As mentioned above with reference to FIGS. 7-8, each of the one or more fasteners 70 may be used to secure the second base member 50 to the structure 22. In some embodiments, the one or more fasteners 70 pass through the one or more openings 28 in order to do so. In other embodiments, the fasteners 70 are engaged with one or more mounting bosses 71 disposed on the structure 22.

As another example, the funnel 80 may be secured to the structure 22 using the one or more openings 28, such that the reservoir 82 is mounted to the exterior side 26 of the structure 22. As mentioned above, the reservoir 82 may be mounted on the exterior side 26 of the structure 22 and the spout 86 may protrude from the interior side 24. As shown, the spout 86 may extend through one of the one or more openings 28.

Thus, although there have been described particular embodiments of the present invention of a new and useful DETACHABLE WATER CONTAINER, it is not intended that such references be construed as limitations upon the scope of this invention.

What is claimed is:

1. A detachable fluid container apparatus for attachment to a structure, comprising:
   a container;
   a first base member disposed on the container and configured to be secured to the structure;
   a second base member configured to mate with the first base member in a detachable engagement;
   a first magnet disposed on the first base member; and
   a second magnet disposed on the second base member and configured to provide a magnetic engagement with the first magnet when the second base member mates with the first base member,
   wherein the second base member includes a bracket and one or more flanges disposed on the bracket that engage the first base member when the second base member mates with the first base member, such that the first base member is received between the bracket and the one or more flanges.

2. The apparatus of claim 1, wherein the container has a convex front wall and a back wall opposite the convex front wall.

3. The apparatus of claim 2, wherein the first base member is disposed on the back wall of the container.

4. The apparatus of claim 1, wherein the one or more flanges include one or more upper flanges protruding downward from a top of the second base member, and
   wherein the one or more flanges include one or more flanges protruding upward from a bottom of the second base member.

5. The apparatus of claim 1, wherein the one or more flanges define one or more grooves in between the one or more flanges and the bracket, and
   wherein the first base member is positioned within the one or more grooves when the second base member mates with the first base member.

6. The apparatus of claim 1, wherein the second base member includes an open end and a closed end opposite the open end,
   wherein the first base member moves through the open end in order to mate with the second base member, and
   wherein the first base member mechanically engages the closed end when the second base member mates with the first base member.

7. The apparatus of claim 1, further comprising a funnel configured to be positioned above the container.

8. A detachable container apparatus, comprising:
   a container;
   a first base member disposed on the container;
   a second base member configured to mate with the first base member in a detachable mating attachment; and
   a funnel having a reservoir and a spout,
   wherein the funnel is configured to be secured to a structure having a first side and a second side opposite the first side, such that the reservoir is mounted to the second side of the structure and the spout protrudes from the first side of the structure at a location that is above the container.

9. The apparatus of claim 7, wherein the structure further includes a hole extending from the first side to the second side, and
   wherein the spout extends through the hole.

10. The apparatus of claim 8, wherein the funnel further includes a threaded body disposed on the spout and a threaded fastener secured to the threaded body, such that the threaded fastener engages the first side of the structure.

11. The apparatus of claim 8, wherein the second base member is secured to the structure.

12. The apparatus of claim 11, wherein the second base member is secured to the structure such that the first side of the structure faces the container.

* * * * *